United States Patent

[11] 3,582,062

[72] Inventors Patricia M. Andrus;
Charles J. Kunz, both of Rochester, N.Y.
[21] Appl. No. 794,032
[22] Filed Jan. 27, 1969
[45] Patented June 1, 1971
[73] Assignee Eastman Kodak Company
Rochester, N.Y.

[54] AUTOMATIC CASSETTE LOADER AND UNLOADER FOR SHEET FILM
3 Claims, 4 Drawing Figs.

[52] U.S. Cl. .................................................... 271/5
[51] Int. Cl. .................................................... B65h 5/10
[50] Field of Search ........................................ 271/5, 11, 14, 15, 16, 4

[56] References Cited
UNITED STATES PATENTS
2,262,109  11/1941  Miller ........................... 271/5X

*Primary Examiner*—Joseph Wegbreit
*Attorneys*—Robert W. Hampton and Milton S. Sales

ABSTRACT: A machine for automatically unloading sheet material from a cassette, depositing the removed sheet material in a receptacle, removing another sheet of material from a storage magazine and reloading the cassette with the latter sheet material. The machine includes a pickup device for selectively grasping the sheet material and a transport mechanism for moving the pickup device between the cassette, the receptacle and the magazine.

AUTOMATIC CASSETTE LOADER AND UNLOADER FOR SHEET FILM

CROSS-REFERENCES TO RELATED APPLICATIONS

Reference is made to commonly assigned copending U.S. applications Ser. No. 625,829, entitled X-RAY CASSETTE, filed Mar. 24, 1967 now Pat. No. 3,504,180 in the name of Fredrick F. Tone and Ser. No. 794,031 entitled AN AUTOMATIC DISPENSER AND STORAGE DEVICE FOR SHEET FILM, filed concurrently herewith in the names of Stephen J. Wenthe and Charles F. Shute.

BACKGROUND OF THE INVENTION

1. Field of the Invention

This invention relates to automatic cassette unloading and loading machines, and more particularly to machines of this type which are adapted to unload an exposed sheet of film from a cassette, to feed the unloaded sheet of film into an automatic processor and to reload the cassette with a new sheet of unexposed film.

2. Description of the Prior Art

Before the advent of automatic loading and unloading machines, cassettes containing exposed film were passed into a darkroom through a lighttight slit. An operator in the darkroom would manually open the cassette, remove the exposed film and feed it into a processor. The operator would then remove a similar sheet of unexposed film from a storage area, insert it into the cassette and pass the loaded cassette out of the darkroom.

Various forms of machines for performing the above-described operation automatically by removing exposed film from a cassette and reloading the cassette with fresh film are known in the prior art. One such machine is shown in U.S. Pat. No. 3,150,263 to Kenneth G. Catlin entitled "Cassette Unloading and Reloading Machine." That patent discloses a machine into which cassettes are fed and wherein the cassette is opened and a suction-supplied cup lowered onto the exposed film. The film is then raised from the cassette by the cup and fed through a series of rollers to a processor. Fresh film is stored in a series of drawers, each drawer containing a different size film corresponding to the sizes of cassettes acceptable by the machine. The drawers are selectively opened and the sheet of film removed by one of a series of suction cups, the film then being lead to one of a series of film guide chutes. The guide chutes leads to a position at which the now empty cassette is waiting to receive a sheet of fresh film. While such a machine serves its intended function of removing the exposed film from the cassette and reloading it with a sheet of unexposed film, the duplication of parts inherent in such a machine unnecessarily increases the size, complexity and expense of manufacture.

SUMMARY OF THE INVENTION

It is an object of the present invention to provide a machine for unloading sheet material from containers and reloading those containers with a fresh sheet carried from a magazine, the machine having a sheet material grasping means and a transport device for moving the grasping means.

It is another object of the present invention to provide a film pickup device carried by a transport mechanism which sequentially moves the pickup device to a position adjacent a film cassette where exposed film is grasped by the takeup device, to a position adjacent an exposed film-receiving receptacle where the exposed film is released into the receptacle, to a position adjacent a film storage magazine containing unexposed film where the pickup device engages a sheet of unexposed film and back to the position adjacent the cassette where the cassette is reloaded with the unexposed film.

In accordance with a preferred embodiment of the invention, a film pickup device is provided with a plurality of suction cups for grasping a single sheet of film. The pickup device is carried by a transport mechanism which moves the pickup device along a pair of angularly related axes through a path between a film cassette to be unloaded and reloaded, a receptacle for passing exposed film unloaded from the cassette to an automatic film processor, a magazine containing unexposed film, and back to the cassette.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
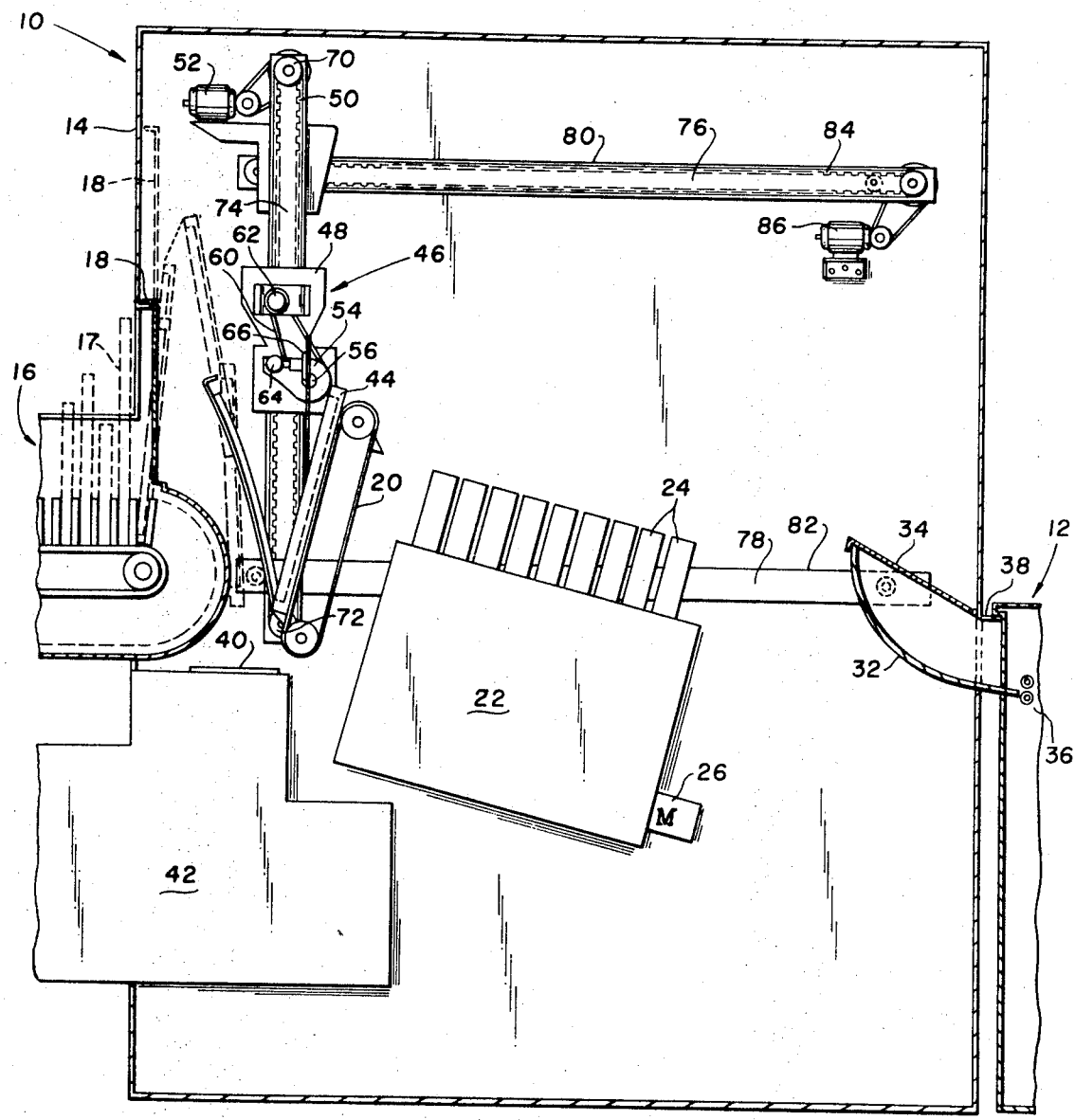
FIG. 1 is a partially segmental schematic view showing the operation of the present invention.

FIG. 1 shows an automatic cassette unloader and loader machine 10 which is coupled to a film processor 12 of known construction. Unloader and loader machine 10 has a housing 14 with a cassette feed conveyor 16 mounted thereon for intermittently bringing cassettes such as shown at 17 containing exposed film up to the outside of a vertically slideable door 18. The cassettes may be of the type shown in commonly assigned copending U.S. application Ser. No. 625,829.

Within housing 14, a conveyor 20 which forms a work station is positioned to receive cassettes from conveyor 16 and to position them according to their size at a fixed height. The cassettes are removed from conveyor 16 and carried to conveyor 20 by any suitable mechanism, not shown.

Also within housing 14 is a magazine 22 containing cartridges 24, each cartridge being loaded with a specific type and size of film corresponding to the types and sizes of film to be carried by the cassettes and processes in processor 12. The details and operation of magazine 22 are disclosed in copending U.S. application Ser. No. 794,031, entitled "An Automatic Dispenser and Storage Device for Sheet Film," filed concurrently herewith in the names of Stephen J. Wenthe and Charles F. Shute. It will suffice for the purposes of the present application to state that magazine 22 is provided with a motor 26 which, when energized, raises a selected film cartridge such as 24 in FIG. 3. Selection of the proper cartridge is carried out by a sensing mechanism, not shown, associated with the conveyor platform 20 and coded information on the cassettes to be reloaded. When a cartridge is raised, its door 30, see FIG. 3, is automatically opened to present the film carried therein to a film pickup device to be later described.

A sheet metal guide chute or ramp 32 is positioned within housing 14 at the right as shown in FIG. 1 and forms a receptacle for receiving exposed film removed from the cassettes. Guide chute 32 is normally covered by a hingeably mounted door 34 and leads to a set of rollers 36 in processor 12. The space between unloader and loader machine 10 and processor 12 is sealed by a lighttight diaphragm 38 to prevent exposure of film passing down ramp 32 to rollers 36 during the process to be later explained.

Once the cassettes have been reloaded with unexposed film from magazine 22, they are automatically ejected from the machine through a lighttight door 40 to a storage area 42 for further use.

Figure 2:
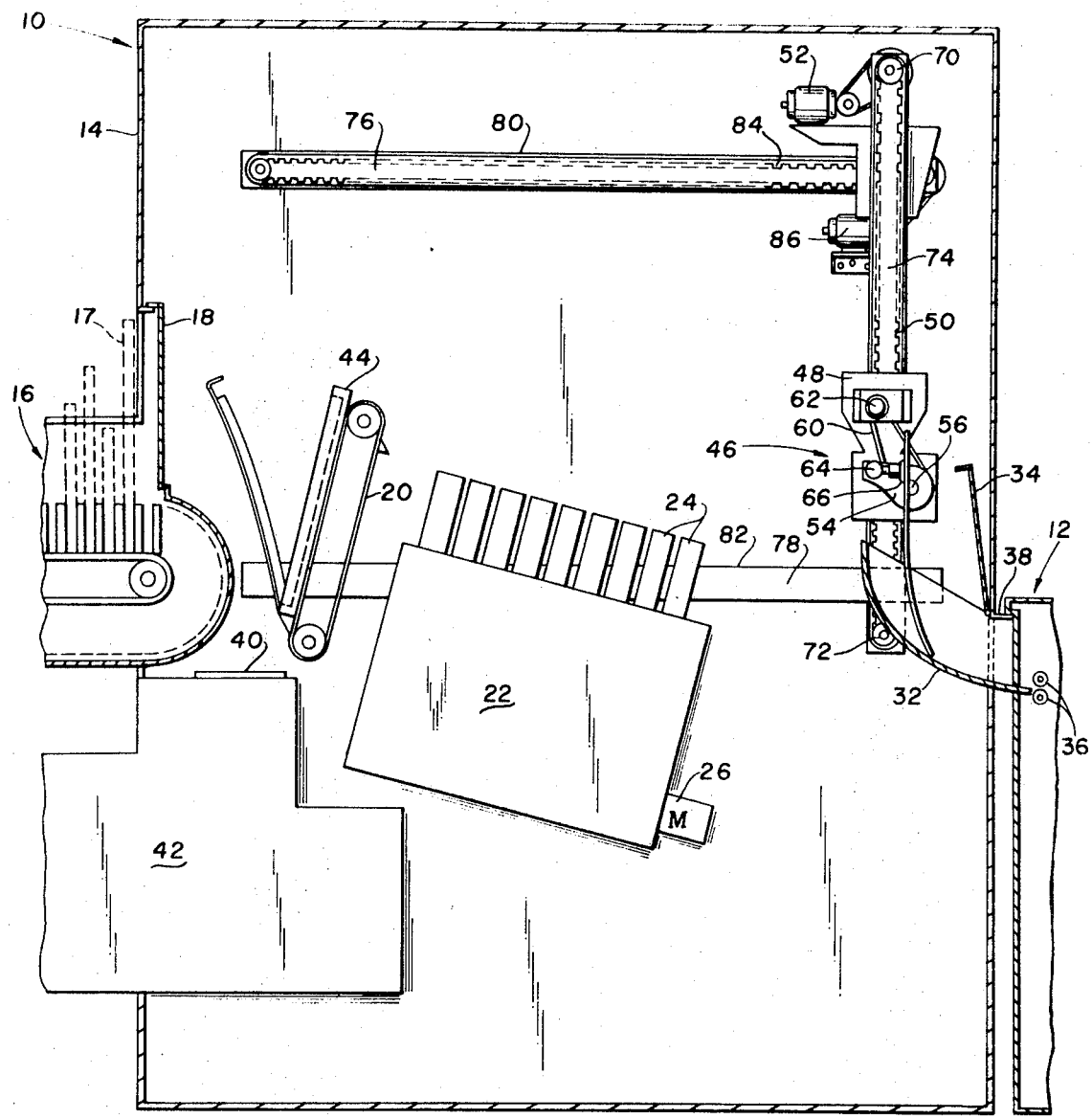
FIG. 2 is a partially segmental schematic view similar to FIG. 1 with the parts in another position.
Figure 3:
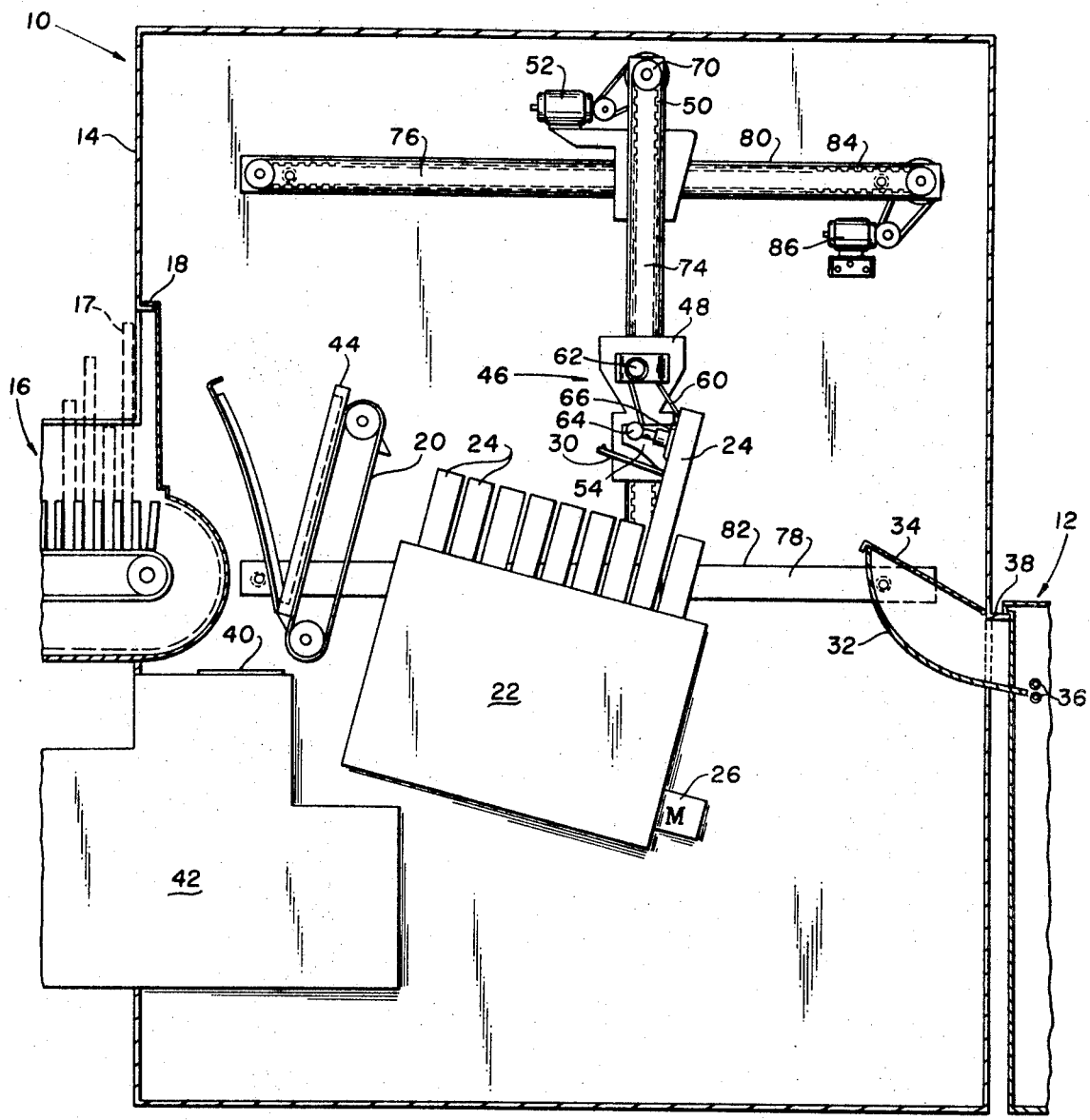
FIG. 3 is a partially segmental schematic view similar to FIGS. 1 and 2 with the parts in still another position.
Figure 4:
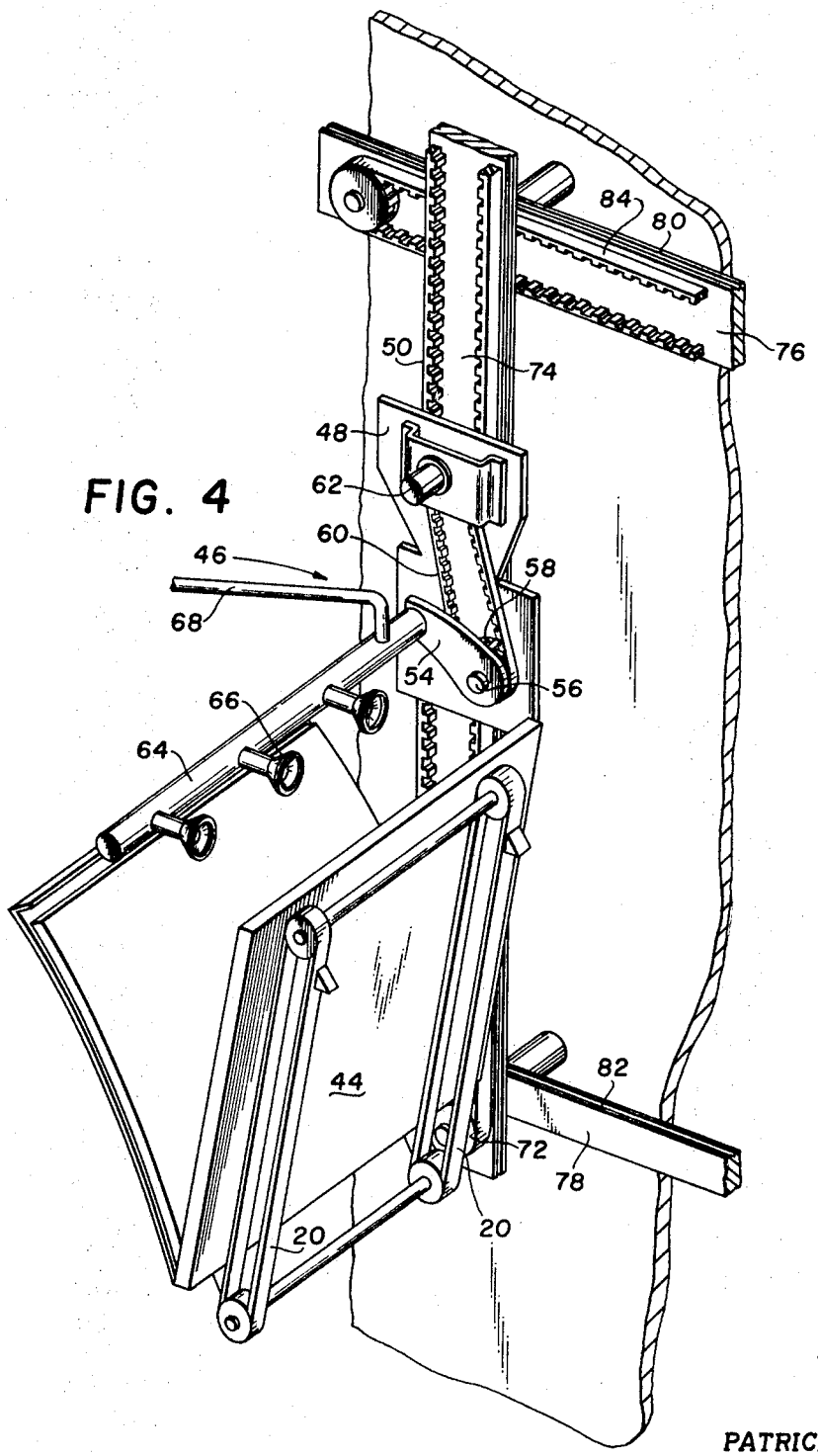
FIG. 4 is a segmental perspective view of a portion of the device shown in FIGS. 1—3.

FIG. 4 is an enlarged view of the mechanism shown in FIGS. 1—3 for picking film from either the cassette or film cartridge. As shown, the mechanism is in a position preparatory to picking exposed film from an open cassette 44. The pickup device denoted generally by reference numeral 46 includes a carriage 48. An arm 54 is pivotally mounted at 56 to carriage 48 and carries a sprocket pulley 58. Pulley 58 is powered by a second belt 60 which is driven by a rotary solenoid 62.

A rigid, hollow tube 64 extends from arm 54 and is provided with a plurality of rubber cups 66, three of which are shown. Tube 64 is selectively supplied with vacuum via flexible hollow tubing 68. When vacuum is supplied to cups 66, pickup device 46 is in a film-grasping state, and when the vacuum is relieved, pickup device 46 is in a film-releasing state.

Carriage 48 is carried on an endless sprocket belt 50. Belt 50 is trained over a pulley 70 driven by motor 52, FIG. 1, and an idler pulley 72. Each pulley is carried by a rigid support member 74. Motor 52 can be selectively energized to raise or lower carriage 48 and pickup device 46. Support member 74 is carried on a pair of horizontal support members 76 and 78 by rollers, not shown, which ride along tracks 80 and 82 on the top edges of support 76 and 78, respectively. Support member 74 and pickup device 46 carried thereby are horizontally movable along tracks 80 and 82 by a sprocket belt 84 powered by motor 86.

The axes of belts 50 and 84 do not have to be vertical and horizontal, respectively; nor must they be at right angles to each other. Further, other drive means such as screw and traveling nut may be used instead of the belts. Motors 52 and 86, solenoid 62 and the vacuum supply are controlled by a timing and switching mechanism, not shown. The timing mechanism may be of any conventional form such as cam-operated electric switches.

OPERATION

Referring to FIG. 1, a plurality of cassettes 17 each containing a sheet of exposed film are loaded onto feed conveyor 16 and are indexed towards lighttight door 18. The door is raised and the leading cassette is carried by a loading mechanism, not shown, to conveyor work station 20. After the cassette is opened, pickup device 46 is positioned by motors 52 and 86 adjacent the film carried in cassette 44. Solenoid 62 is activated to rotate arm 54 in a clockwise direction as shown in FIG. 4 until suction cups 66 lie in a plane parallel to that of the film within cassette 44. The suction cups are then advanced into contact with the film within the cassette until motors 52 and 86 are deactivated by a pressure switch, not shown, responsive to contact of the suction cups with the film. At that time, vacuum is applied to the suction cups, via flexible tube 68 and pickup device 46 carrying the sheet of exposed film is backed out of cassette 44. Of course, the vacuum may be applied before contact is made with the film.

Pickup device 46 is now raised by motor 52 and is carried to the right as seen in FIG. 1 by activation of motor 86 to the position shown in FIG. 2 in which the film is suspended over ramp 32. Suction to cups 66 is now turned off to release the sheet of film into the ramp which guides the film into automatic processor 12 and rollers 36.

At this time, motors 52 and 84 are once again activated to carry pickup device 46 to a position above and to the left of magazine 22. During this movement, the proper cartridge 24 will be raised by motor 26 and opened to present the proper film for reloading cassette 44. Pickup device 46 will be indexed rightwardly and downwardly along the slope of magazine 22 until cups 66 make contact with the unexposed film in open cartridge 28, at which time a pressure sensitive switch will deactivate motors 52 and 84. Of course, solenoid 62 has been activated at this time to rotate tube 64 to bring cups 66 into the plane of the film.

After suction is applied to cups 66, motors 52 and 84 are once more activated to remove pickup device 46 together with one sheet of film from cartridge 28 and to carry that sheet to the position shown in FIG. 1 for reloading cassette 44. Cartridge 24 is now retracted into magazine 22. Once the film has been inserted into cassette 44, the cassette is closed and ejected through lighttight door 40 into reloaded cassette storage area 42.

The invention has been described in detail with particular reference to preferred embodiments thereof, but it will be understood that variations and modifications can be effected within the spirit and scope of the invention.

We claim:

1. A device for carrying sheet material stock in a machine, the machine having a magazine for housing new sheets of the stock, a receptacle for receiving sheets of the stock, and a work station for receiving cassettes containing sheets of the stock whereat the sheets are to be removed from the cassette to be deposited in the receptacle and whereat new sheets of stock from the magazine are to be deposited in the cassette, said device comprising:
    a. movably mounted means for selectively grasping a sheet in the cassette, moving the sheet thus grasped to the receptacle, and releasing the sheet into the receptacle; and
    b. movably mounted means for selectively grasping a new sheet housed in the magazine, moving the new sheet thus grasped to a position adjacent the work station and releasing the new sheet for reloading the cassettes.

2. A film cassette unloading and loading machine comprising:
    a. a station for holding an open cassette containing a sheet of film;
    b. a receptacle for receiving sheets of film;
    c. a magazine adapted to house a supply of new sheets of film;
    d. a film pickup device having a film-grasping condition and a film-releasing condition;
    e. transport means for sequentially moving said pickup device to first, second, third and fourth positions adjacent said station, said receptacle, said magazine and said station, respectively; and
    f. means for actuating said pickup device to produce said film-grasping condition thereof when said pickup device is in said first position, to produce said film-releasing condition when said pickup device is in said second position, to produce said film-grasping condition when said pickup device is in said third position, and to produce said film-releasing condition when said pickup device is in said fourth position, whereby film contained in the cassette at said station may be removed and carried to said receptacle into which it is deposited and whereby fresh film from said magazine may be loaded into the cassette.

3. A machine for unloading and loading a sheet material carrying cassette, said machine comprising:
    a. a work station for receiving the cassettes containing sheet material;
    b. a receptacle spaced from said work station and adapted to receive the sheet material unloaded from the cassettes;
    c. a magazine for supplying new sheet material to be loaded into the cassettes;
    d. a sheet material pickup device having selectively activated suction means for grasping said sheet material;
    e. a transport mechanism including means for moving said pickup device between said work station, said receptacle and said magazine; and
    f. means for applying suction to said pickup device when it is adjacent said work station to render said device effective to pick up a sheet of sheet material from a cassette, for releasing said suction when said pickup device is adjacent said receptacle for releasing said sheet into said receptacle, for reapplying the suction when said pickup device is adjacent said magazine for enabling said device to pick up a new sheet of sheet material, and for releasing the suction when said pickup device returns to the position adjacent said work station for releasing said new sheet into a cassette.